(12) United States Patent
Kim

(10) Patent No.: US 10,039,404 B2
(45) Date of Patent: Aug. 7, 2018

(54) JUICE EXTRACTOR

(76) Inventor: Young Ki Kim, Gyeongsangnam-do (KR)

( * ) Notice: Subject to any disclaimer, the term of this patent is extended or adjusted under 35 U.S.C. 154(b) by 129 days.

(21) Appl. No.: 14/122,909

(22) PCT Filed: Mar. 29, 2012

(86) PCT No.: PCT/KR2012/002325
§ 371 (c)(1),
(2), (4) Date: Dec. 20, 2013

(87) PCT Pub. No.: WO2012/173333
PCT Pub. Date: Dec. 20, 2012

(65) Prior Publication Data
US 2015/0007733 A1 Jan. 8, 2015

(30) Foreign Application Priority Data

Jun. 14, 2011 (KR) .................. 10-2011-0057563

(51) Int. Cl.
*A47J 19/00* (2006.01)
*A47J 19/02* (2006.01)

(52) U.S. Cl.
CPC ............. *A47J 19/02* (2013.01); *A47J 19/025* (2013.01)

(58) Field of Classification Search
CPC ............ A23N 1/00; A23N 1/02; A47J 19/025
USPC .................. 99/495, 510, 509, 513, 511, 494
See application file for complete search history.

(56) References Cited

U.S. PATENT DOCUMENTS

| | | | | | |
|---|---|---|---|---|---|
| 5,381,730 | A | * | 1/1995 | Kim | A23N 1/00 100/117 |
| 5,452,650 | A | * | 9/1995 | Lee | A47J 19/06 241/101.2 |
| 5,592,873 | A | * | 1/1997 | Lee | A47J 19/025 366/307 |
| 5,906,154 | A | * | 5/1999 | Yoon | A23N 1/00 100/117 |
| 6,637,323 | B2 | * | 10/2003 | Kim | A47J 19/025 100/117 |
| 6,854,382 | B2 | * | 2/2005 | Jan | A23N 1/00 100/117 |
| 8,640,610 | B2 | * | 2/2014 | Wang | A47J 19/025 99/502 |

(Continued)

FOREIGN PATENT DOCUMENTS

| | | |
|---|---|---|
| CN | 1353582 | 6/2002 |
| JP | 58-181323 | 12/1983 |
| JP | 3092877 | 4/2003 |

(Continued)

OTHER PUBLICATIONS

Extended European Search Report for corresponding European Application No. 12800099.9 dated Oct. 15, 2014, 6 pages.

(Continued)

*Primary Examiner* — Dana Ross
*Assistant Examiner* — Ayub Maye
(74) *Attorney, Agent, or Firm* — Alston & Bird LLP

(57) ABSTRACT

A juice extractor, which can prevent juice from being easily discharged via a very small part of a space defined between a feed screw and a hard cylindrical control part of a control cap even when residue is being discharged therethrough, thereby realizing the maximum juice extraction ratio for each different kind of input material.

2 Claims, 4 Drawing Sheets

(56) References Cited

U.S. PATENT DOCUMENTS

2003/0070565 A1* 4/2003 Brezovnik ............ A47J 43/085
99/492
2003/0154867 A1 8/2003 Kim

FOREIGN PATENT DOCUMENTS

| KR | 20-1999-0020592 U | 6/1999 |
|----|----|----|
| KR | 20-2000-0007534 U | 5/2000 |
| KR | 10-2002-0057737 A | 7/2002 |
| KR | 100433171 B1 | 6/2004 |
| KR | 1020050034883 A | 4/2005 |
| KR | 2006-0025923 A | 3/2006 |
| KR | 100755440 B1 | 9/2007 |
| TW | 269790 | 2/1996 |
| TW | 353599 | 3/1999 |
| TW | M352968 | 3/2009 |
| WO | WO 00/74502 A1 | 12/2000 |

OTHER PUBLICATIONS

Grant Decision for corresponding Korean Application No. 10-2011-0057563 dated May 27, 2013, 2 pages.
Office Action for corresponding Japanese Application No. 2014-513416 dated Dec. 26, 2015.
Office Action for corresponding Korean Application No. 10-2011-0057563 dated Nov. 16, 2012, 3 pages.
Office Action for corresponding Taiwanese Application No. 101121406 dated Feb. 13, 2014, 8 pages.
Office Action for corresponding Taiwanese Application No. 101121406 dated Mar. 25, 2015, 7 pages.
International Written Opinion for corresponding International Application No. PCT/KR2012/002325, dated Oct. 29, 2012.
International Search Report for Application No. PCT/KR2012/002325 dated Oct. 29, 2012.
Office Action for European Application No. 12800099.9 dated Dec. 14, 2017, 4 pages.

* cited by examiner

[Fig. 1]
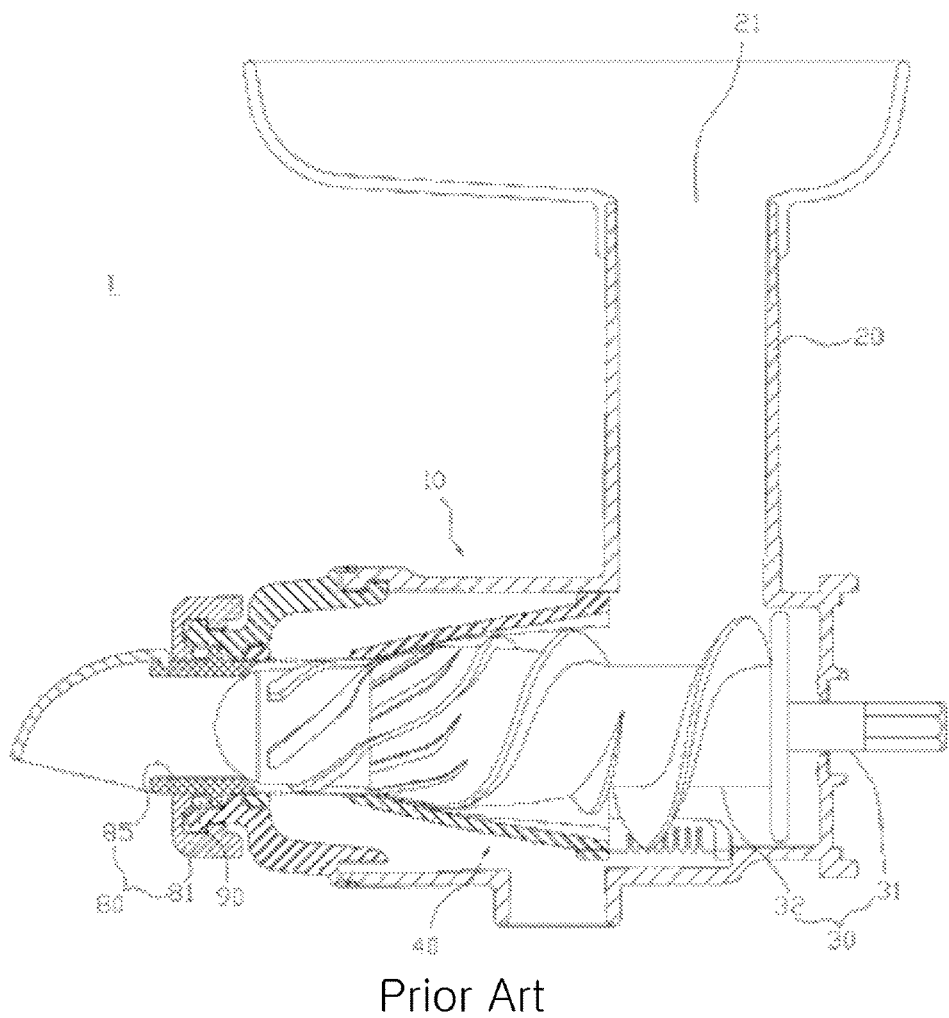
Prior Art

[Fig. 2]
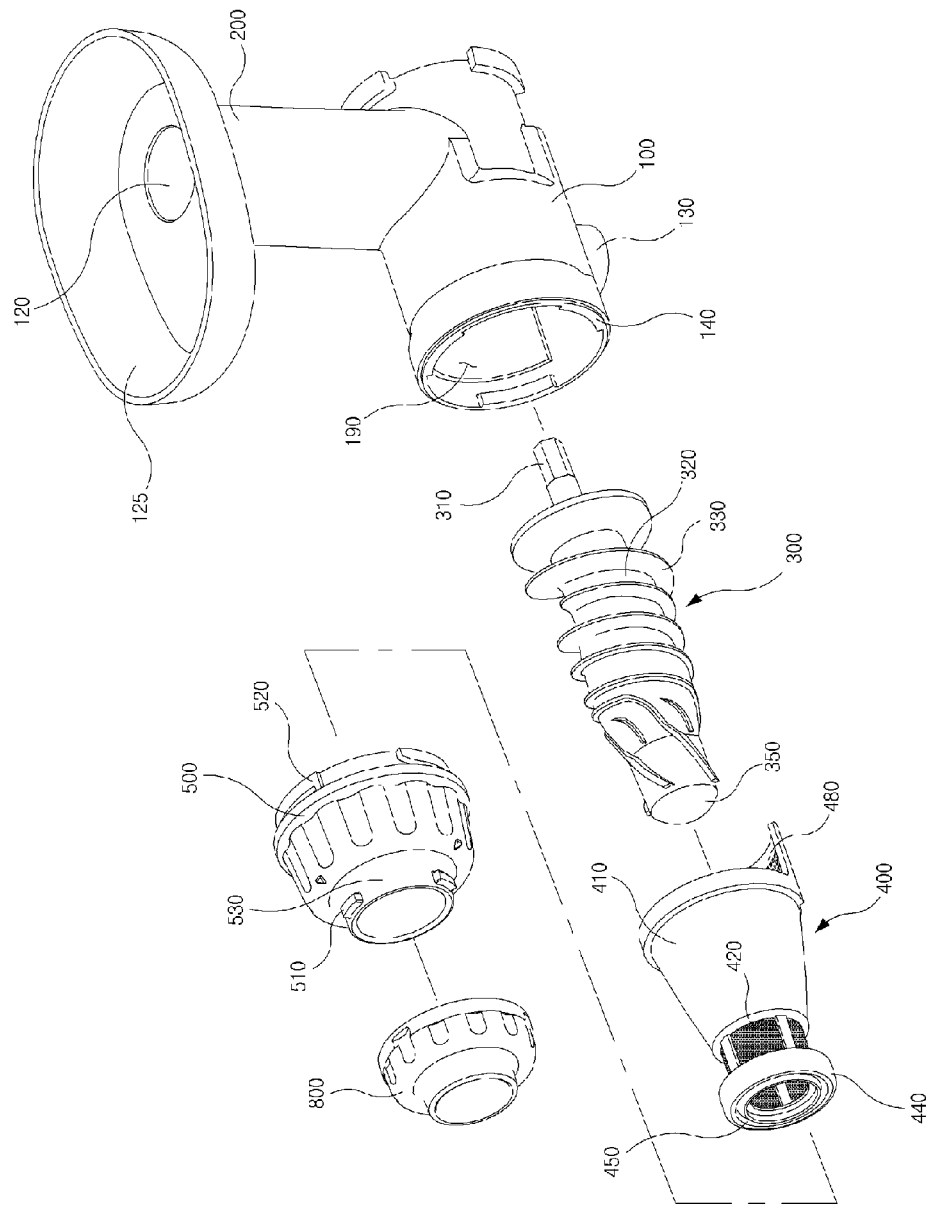

[Fig. 3a]
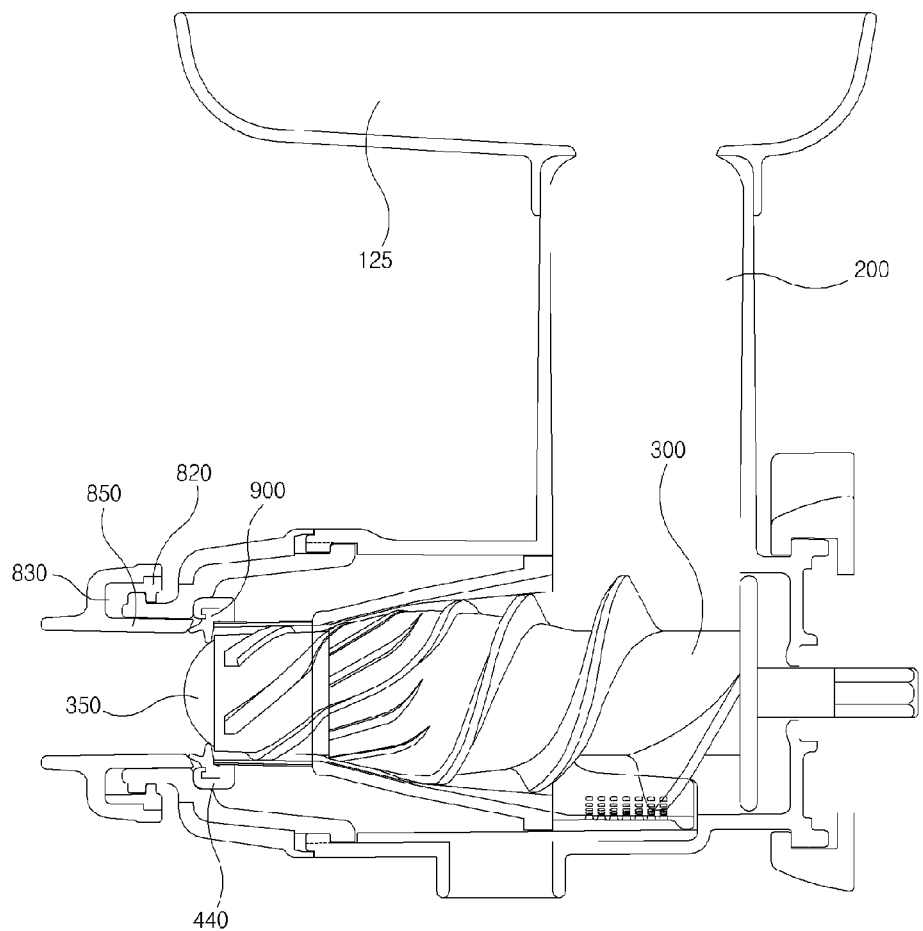

[Fig. 3b]
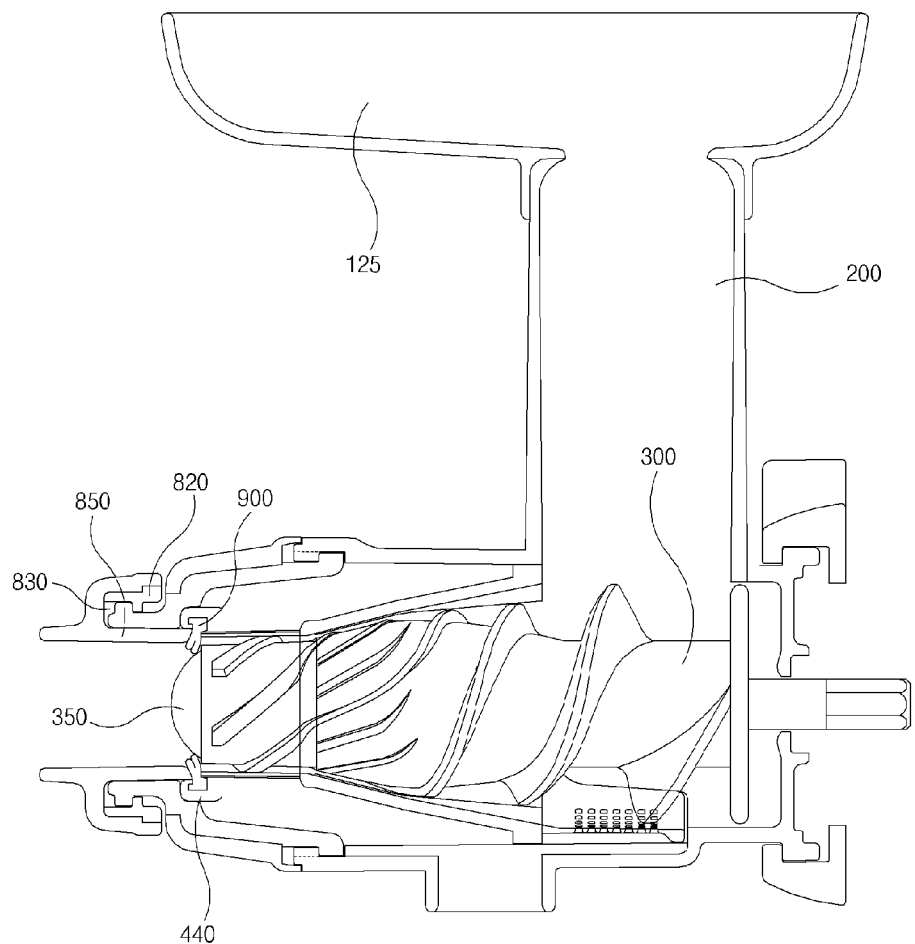

JUICE EXTRACTOR

TECHNICAL FIELD

The present invention relates to a juice extractor that can make juice from vegetables or fruits.

BACKGROUND ART

In recent years, with the increased interest in well-being, many people are personally making green vegetable juice or fruit juice from fresh vegetables or fruits. Thus, there are various juicers for making fruit juice and green vegetable juice that are available and whose purpose is to easily make fruit juice or green vegetable juice at home.

An example of such a juice extractor is the one proposed in Korean Patent No. 609390, which was filed by the applicant of this invention and registered. FIG. 1 is a sectional view showing the configuration of a conventional juice extractor. As shown in FIG. 1, the juice extractor 1 is configured so that a long feed screw 30 is horizontally assembled in a housing 10, together with a strainer 40, to be coupled to a sidewall of a driving unit by a rotating shaft 31. When the material used to make the juice is put into a feed port 21 of a feed tube 20, the feed screw slowly feeds the material horizontally while extracting juice.

In the conventional juice extractor, to prevent juice from being undesirably discharged along with the discharged residue, a hard cylindrical control part 85 of a control cap 80 is biased rightwards and compresses the residue that is being discharged through a space defined between the feed screw 30 and the cylindrical control part 85. Further, to realize a desired juice extraction ratio according to the kind of input material, the conventional juice extractor is configured so that the level of the force that biases the hard cylindrical control part 85 rightwards can be controlled by the elasticity of a spring or a rubber packing 90 in response to a rotating angle of the control cap 81.

However, the conventional juice extractor is problematic in that the residue is discharged through a residue discharging part defined between the strainer 40 and the feed screw 30 and, further, even when the residue is discharged via a very small part of a space defined between the cylindrical control part 85 and the feed screw 30 in a state in which the hard cylindrical control part 85 is being biased, the hard cylindrical control part 85 is pushed to the left as a whole and undesirably opens a peripheral space through which no residue is discharged, so that juice may be easily discharged through the open space.

DISCLOSURE OF INVENTION

Technical Problem

Accordingly, the present invention has been made keeping in mind the above problems occurring in the related art, and a purpose of the present invention is to propose a juice extractor which can prevent juice from being easily discharged even when a residue is discharged via a very small part of a space defined between a feed screw and a hard cylindrical control part of a control cap, thereby realizing the maximum juice extraction ratio for different kinds of input material.

Solution to Problem

In order to achieve the above object, according to one aspect of the present invention, there is provided a juice extractor including: a housing having a juice discharge port formed in a lower part thereof and an interior space defined therein; a strainer placed in the interior space of the housing and having both a crushing part and a discharging net a feed screw placed in the strainer and rotating in such a way that a rotating screw bar, which has spiral teeth and forms a part of the feed screw, can be rotated horizontally and a housing cap assembled with a control cap, further including: a soft elastic body installed between an end of the feed screw and a cylindrical control part of the control cap through which residue is discharged.

In the juice extractor, the shape of the soft elastic body may be a ring shape and the end of the strainer may be provided with a side ring to hold the soft elastic body.

Further, the cylindrical control part of the control cap may be integrated with the control cap into a single body.

Advantageous Effects of Invention

As described above, the juice extractor of the present invention includes: the housing having the juice discharge port formed in the lower part thereof and an interior space defined therein; the strainer placed in the interior space of the housing and having both the crushing part and the discharging net the feed screw placed in the strainer and rotated in such a way that a rotating screw bar, which has spiral teeth and forms a part of the feed screw, can be rotated horizontally and the housing cap assembled with the control cap, wherein the soft elastic body is installed between the end of the feed screw and the cylindrical control part of the control cap through which the residue is discharged, so that the residue discharging force of the juice extractor can be controlled by compressing the surface of the soft elastic body by a rotation of the control cap. Therefore, when the residue is being discharged via a very small part of a ring-shaped space defined between the hard cylindrical control part and the feed screw, the soft elastic body is deformed in the very small space through which the residue is being discharged, so that the residue can be discharged through the very small space. However, in another part of the ring-shaped space through which no residue is discharged, the soft elastic body is not deformed so that it is possible to prevent juice from being easily discharged via the space through which no residue is discharged. Accordingly, the juice extractor of the present invention can realize the maximum juice extraction ratio for each different kind of input material.

Further, in the present invention, the shape of the soft elastic body is a ring shape and the distal end of the strainer is provided with the side ring to hold the soft elastic body, so that it is possible to close the ring-shaped space defined between the hard cylindrical control part and the feed screw, thereby preventing the juice from being easily discharged and, accordingly, realizing the maximum juice extraction ratio for each different kind of input material.

Further, in the present invention, the cylindrical control part of the control cap is preferably integrated with the control cap into a single body, so that the residue discharging force can be easily controlled by the control cap.

BRIEF DESCRIPTION OF DRAWINGS

The above and other objects, features and further advantages of the present invention will be more clearly understood from the following detailed description when taken in conjunction with the accompanying drawings, in which:

FIG. 1 is a sectional view illustrating the construction of a conventional juice extractor;

FIG. 2 is an exploded perspective view illustrating the construction of a juice extractor according to the present invention;

FIG. 3a is a sectional view illustrating the construction of the juice extractor according to the present invention; and FIG. 3b is a sectional view illustrating a state in which the soft elastic body of the juice extractor according to the present invention is being compressed.

MODE FOR THE INVENTION

Hereinafter, the preferred embodiment of the present invention will be described in detail with reference to the accompanying drawings (components common to Korean Patent No. 755440 and the present invention will use the same reference numerals). The terminologies or words used in the description and the claims of the present invention should not be interpreted as being limited merely to their common and dictionary meanings. On the contrary, they should be interpreted based on the meanings and concepts of the invention in keeping with the scope of the invention based on the principle that the inventor(s) can appropriately define the terms in order to describe the invention in the best way.

It is to be understood that the form of my invention shown and described herein is to be taken as a preferred embodiment of the present invention and that various changes and modifications may be made in the invention without departing from the spirit and scope thereof.

As shown in FIGS. 2 and 3, the present invention provides a juice extractor including: a housing having a juice discharge port formed in a lower part thereof and an interior space defined therein; a strainer placed in the interior space of the housing and having both a crushing part and a discharging net a feed screw placed in the strainer and rotated in such a way that a rotating screw bar thereof can be rotated horizontally, with spiral teeth being formed around the rotating screw bar and a housing cap assembled with a control cap, wherein a soft elastic body is installed between an end of the feed screw and a cylindrical control part of the control cap through which the residue is discharged.

Further, the shape of the soft elastic body is a ring shape and the end of the strainer is provided with a side ring that holds the soft elastic body.

Further, the cylindrical control part of the control cap is integrated with the control cap into a single body.

FIG. 2 is an exploded perspective view illustrating the construction of a juice extractor according to the present invention. As shown in FIG. 2, the juice extractor includes a housing 100, a feed screw 300, a strainer 400, a housing cap 500 and a control cap 800.

A feed tube 200 assembled with a hopper 125 is provided on the upper end of the housing 100, while a juice discharge port 130 for discharging juice is formed in a bottom of the housing 100, with an interior space 190 being defined inside the housing 100. The interior space 190 has a cylindrical shape and is preferably open in left and right ends. Further, in the left end of the housing 100 defining the interior space 190 therein, housing locking ribs 140 are provided so as to fasten the housing cap 500 to the housing 100. Further, a feed port 120 into which is put the material used to make the juice is formed in the upper end of the feed tube 200.

The feed screw 300 includes: a rotating shaft 310 that protrudes outside from the right end of the housing 100 and receives a drive force from a driving device, such as an external motor (not shown), and a rotating screw bar 320 integrated with the rotating shaft 310 into a single body. The feed screw 300 is horizontally placed in the housing interior space 190 in such a way that the rotating screw bar 320 can be rotated horizontally, with spiral teeth 330 being formed around the rotating screw bar 320 so as to feed and crush the input material.

The strainer 400 includes a crushing part 410 and a discharging net 420 and is placed horizontally in the interior space of the housing 100. The crushing part 410 has a hollow conical shape and is placed so as to surround the feed screw 300, so that the crushing part 410 guides the input material that has been fed forwards (leftwards) by the feed screw 300, thereby crushing the material. The juice produced in the crushing part 410 by the crushing function of the feed screw 300 flows to the juice discharge port 130 through a filtering net 480 that is provided in a rear end of the crushing part 410, and is then discharged to the outside through the juice discharge port 130. The discharging net 420 extends forwards (leftwards) from the crushing part 410 and comes into contact with the outer surface of the distal end 350 of the feed screw 300 and discharges the residue of the material to the outside. The left end surface of the strainer 400 is provided with a side ring 440. In the side ring 440, a ring insert groove 450 for holding a part of a soft elastic ring 900 is formed.

The housing cap 500 is provided with a central opening. Locking protrusions 520 for fastening the housing cap 500 to the housing locking ribs 140 of the housing 100 are formed around an outer circumferential surface of one end of the housing cap 500, while a flange 530 over which the control cap 800 is fitted is formed in the end of the housing cap 500. Further, taper protrusions 510 are formed around the outer circumferential surface of the flange 530.

In the control cap 800, a cylindrical control part 850 having a central opening is formed. A recessed part 830 is formed around the cylindrical control part 850, so that the flange 530 is fitted into the recessed part 830. On the inner surface of the recessed part 830, inclined surface protrusions 820 having respective inclined surfaces are formed and engage with the taper protrusions 510. Here, the inclined surface protrusions 820 are inclined in circumferential directions in such a way that when the control cap 800 is rotated, the control cap 800 can be moved to the left or right by the cooperation of the inclined surface protrusions 820 and the taper protrusions 510, as shown in FIGS. 3a and 3b.

Here, the cylindrical control part 850 and the recessed part 830 of in the control cap 800 may be integrated into a single body.

The soft elastic body 900 has a ring shape and is held by the side ring 440 that is formed on the end of the strainer 400. Here, it is preferred that the soft elastic body 900 be inserted into the ring insert groove 450 formed in the side ring 440.

The operation of the juice extractor according to the present invention will be described hereinbelow.

When the material used to make juice is put into the feed port 120 that is formed in the feed tube 200 of the juice extractor 100, the input material is fed to the left in the housing 100 by the feed screw 300. When the input material is fed to the left, the material is crushed between the feed screw 300 and the crushing part 410 and juice produced by the crushing operation flows to the juice discharge port 130 through the filtering net 480 that is provided in the rear end of the crushing part 410.

The material that has been processed by the crushing part 410 is continuously fed forwards by the rotation of the feed screw 300 and is discharged to the outside via the discharging net 420 while being compressed by the feed screw 300.

When the control cap 800 that is rotatably fitted over the front end of the housing cap 500 is rotated, the control cap 800 is moved forwards or backwards relative to the housing cap 500 by the function of the inclined surfaces of the inclined surface protrusions 820 that are formed on the control cap 800 and are engaged with the taper protrusions 510 of the housing cap 500, so that the control cap 800 compresses or releases the soft elastic ring 900 and changes the force compressing the distal end 350 of the feed screw 300, thereby controlling the residue discharging force of the juice extractor. In other words, a user can finely control the residue discharging force of the juice extractor by rotating the control cap 800 according to a kind of input material.

As described above, the material that has been processed while being fed to the front of the juice extractor by the rotation of the feed screw 300 passes through the cylindrical control part 850 and is discharged downwards from the front end of the juice extractor.

Further, in the above-mentioned process, the force with which the residue is discharged can be controlled by rotating the control cap 800 so as to compress the surface of the soft elastic body 900 that is installed between the cylindrical control part 850 of the control cap 800 and the distal end of the strainer 400.

Accordingly, when the residue is being discharged via a very small part of a ring-shaped space defined between the hard cylindrical control part 850 and the feed screw 300, the soft elastic body 900 is deformed in the very small space through which the residue is being discharged so that it can be discharged therethrough. However, in another part of the ring-shaped space through which no residue is discharged, the soft elastic body 900 is not deformed which makes it possible to prevent juice from being easily discharged via the space through which no residue is discharged. Accordingly, the juice extractor of the present invention can realize the maximum juice extraction ratio for each different kind of input material.

Further, in the present invention, the shape of the soft elastic body 900 is preferably a ring shape and the distal end of the strainer 400 is provided with the side ring 440 for holding the soft elastic body 900, so that it is possible to close the ring-shaped space defined between the hard cylindrical control part 850 and the feed screw 300, thereby preventing the juice from being easily discharged and, accordingly, realizing the maximum juice extraction ratio for each different kind of input material.

Further, in the present invention, the soft elastic body is firmly inserted into the ring insert groove 450 formed in the strainer the side ring, so that the soft elastic body can be continuously retained at the desired location.

Further, in the present invention, the cylindrical control part 850 of the control cap 800 is integrated with the control cap 800 into a single body, so that when the control cap 800 is rotated, the cylindrical control part 850 can be rotated by the same rotating angle. Accordingly, the present invention can easily control the residue discharging force by rotating the control cap 800.

Although a preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A juice extractor, comprising:
a housing having a juice discharge port formed in a lower part thereof and an interior space defined therein;
a strainer placed in the interior space of the housing and having both a crushing part and a discharging net;
a feed screw placed in the strainer and rotated in such a way that a rotating screw bar, which has spiral teeth on a periphery thereof, of the feed screw can be rotated horizontally and a housing cap assembled with a control cap, further comprising:
a soft elastic body installed between an end of the feed screw and a cylindrical control part of the control cap through which a residue is discharged, wherein the cylindrical control part is in direct contact with the soft elastic body and configured to compress the surface of the soft elastic body by a rotation of the control cap, wherein the rotation of the control cap controls an elastic force of the soft elastic body such that a force at which the residue is discharged is controlled, wherein a shape of the soft elastic body is a ring shape, and wherein the end of the strainer is provided with a side ring for holding the soft elastic body.

2. The juice extractor as set forth in claim 1, wherein the cylindrical control part of the control cap is integrated with the control cap into a single body.

* * * * *